Figure 1:
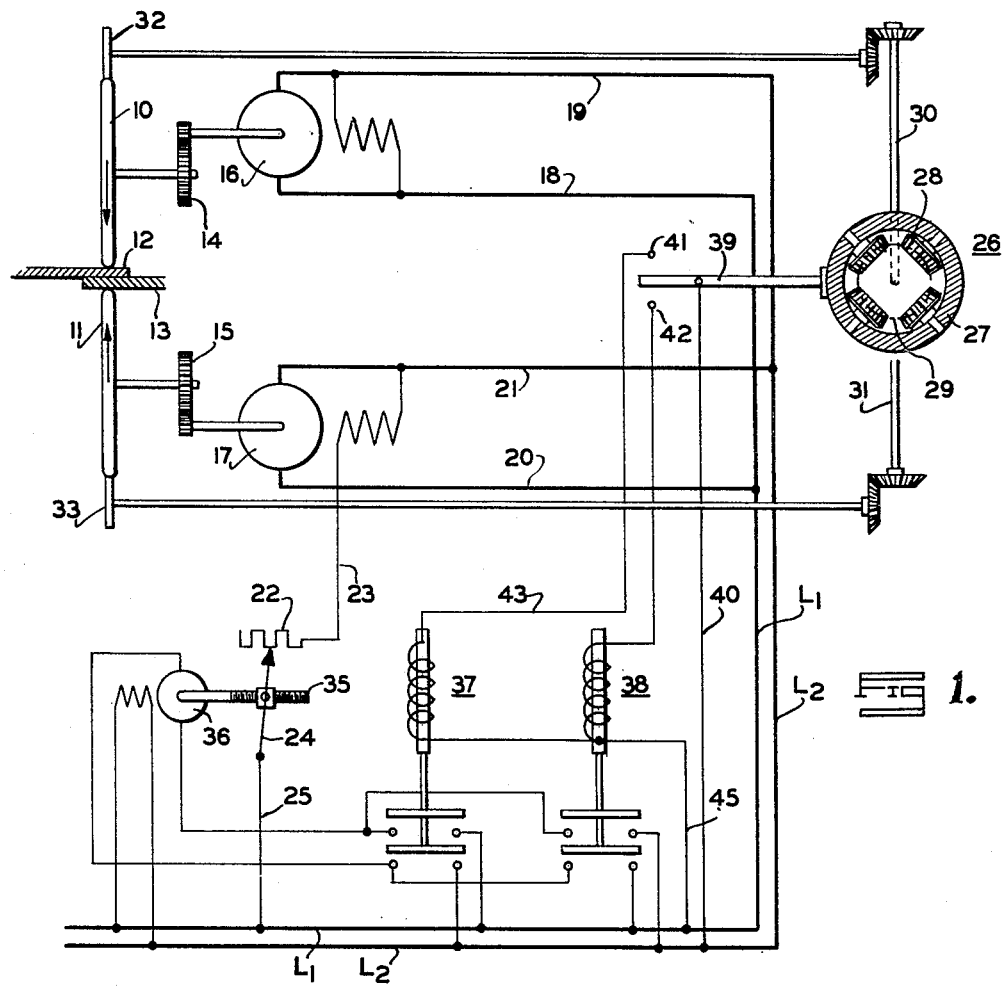

April 10, 1945.　　　　J. D. KELLER　　　　2,373,314

DRIVING MEANS FOR ROLLER ELECTRODES AND THE LIKE

Filed June 16, 1944

Inventor
John D. Keller
By Francis G. Klempay
Attorney

Patented Apr. 10, 1945

2,373,314

UNITED STATES PATENT OFFICE 2,373,314

DRIVING MEANS FOR ROLLER ELECTRODES AND THE LIKE

John D. Keller, Pittsburgh, Pa., assignor to The Taylor-Winfield Corporation, Warren, Ohio, a corporation of Ohio Application June 16, 1944, Serial No. 540,635

5 Claims. (Cl. 219—4)

This invention relates to electric resistance welding apparatus and more particularly to such apparatus employing at least a pair of roller electrodes which are operative to effect a continuous weld or a series of welds along a longitudinal seam of the work to be welded. In apparatus of this character there is provided means to move the work to be welded through the welding throat of the machine or to move the throat or electrodes longitudinally along the work to effect the desired welding progression. Normally the electrodes engage metallic surfaces on opposite sides of the seam or cleft to be welded although in series welding the electrodes may engage metallic surfaces which are on the same sides of the two interstices to be welded as will be readily understood.

It is often desirable in any of the above modes of operation of electric resistance seam welding apparatus employing at least two roller welding electrodes having simultaneous engagement with the work that both the electrodes be driven and that the peripheral speeds of the respective electrodes be kept exactly the same. The latter characteristic is very important as unequal peripheral speeds will cause one or the other of the electrodes to slip relative to the work resulting in damage to the surface thereof and in excessive wear of the electrode. Due to unavoidable unequal wear of the two electrode wheels a drive based on the maintenance of a constant relative speed between the shafts mounting and driving the electrodes will not result in equal peripheral speeds as will be understood. Heretofore, a commonly used arrangement for obtaining uniform and equal peripheral speeds of multiple roller electrodes consisted of a pair of uniformly driven circumferentially grooved and knurled steel wheels mounted for pressure engagement with the outer peripheries of the electrodes. This arrangement, however, has the disadvantage of rapid wearing down of the electrodes particularly if the welding machine is operating under a high duty cycle in which the outer rims of the electrodes become appreciably heated and softened.

It is accordingly the primary object of this invention to provide in an electric resistance seam welding apparatus employing at least two driven roller welding electrodes adapted to have simultaneous contact with the work to be welded improved means to drive both the electrodes in a positive and efficient manner while yet maintaining the peripheral speed of the respective electrodes exactly the same. This object is accomplished, in accordance with the invention, by applying the driving forces to the shafts or hubs of the roller electrodes and by controlling the relative speeds of rotation of the shafts or hubs in accordance with the variations in relative measured speeds of the outer peripheries of the driven welding wheels.

A further and more specific object of the invention is the provision of an improved arrangement for correlating the peripheral speeds of at least a pair of roller electrodes adapted to have simultaneous operative engagement with the work to be welded in electric resistance seam welding apparatus. In accordance with this more specific aspect of the invention the respective electrodes are driven by suitable mechanical means through the hubs or other appropriate members rigidly connected to the revolving electrodes and the speeds of rotation of the respective drives are correlated in response to the operation of a mechanical arrangement which positively and accurately senses the peripheral speeds of the electrodes.

The above and other objects and advantages of the invention will become apparent upon consideration of the following detailed specification and the accompanying drawing wherein there is specifically disclosed a preferred embodiment of the invention.

Figure 2:
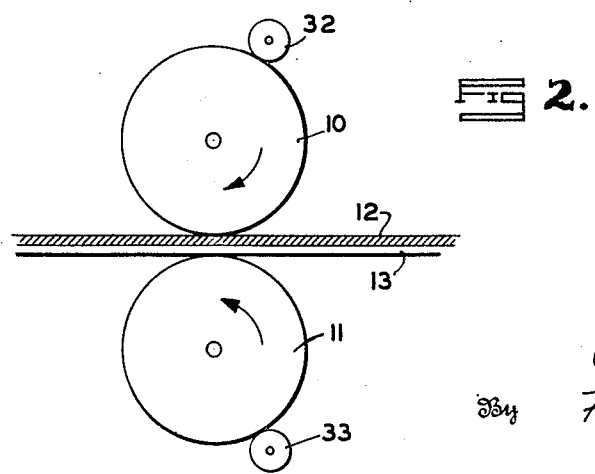

In the drawing:

Figure 1 is a schematic representation of a multiple roller electrode driving arrangement for electric resistance seam welding apparatus constructed in accordance with the principles of the invention; and Figure 2 is a fragmentary end elevation of the apparatus of Figure 1.

Referring to the drawing, reference numerals 10 and 11 designate upper and lower roller electrodes, respectively, of an electric resistance seam welding apparatus of the type in which a driven electrode is employed on each side of the seam or cleft to be welded for the purpose of effecting either a continuous weld or a series of welds along the seam or cleft and for the purpose of moving the work through the welding throat of the apparatus. In actual practice suitable means, not shown, will be employed to apply appropriate welding pressures and currents to the electrodes as will be understood. Reference numerals 12 and 13 designate the work pieces to be welded together. Each of the electrodes 10 and 11 is provided with a suitable driving shaft which is operatively coupled to the hub or other appropriate element rigidly connected to the electrode and these driving shafts are, in turn, arranged to be driven by suitable motive means through the reducing gear 14 for electrode 10 and the reducing gear 15 for the electrode 11.

For illustration purposes I have shown a motor 16 of the shunt wound direct current type for driving the electrode 10 and a similar motor 17 for driving the electrode 11. A suitable source of direct current consisting of the line conductors L1 and L2 is provided to furnish electrical energy to the motors 16 and 17 and in actual practice suitable means, not shown, is employed to control the flow of current into the line L1, L2 for general and speed control purposes. The armature and field winding of motor 16 is connected directly across the line L1, L2 by means of the conductors 18 and 19 and the armature of motor 17 is also connected directly across this line by means of the conductors 20 and 21. In series with the shunt field winding of the motor 17 across the supply line L1, L2 is a variable resistance 22, the circuit being traceable from conductor L2 through conductor 21, field winding of motor 17, conductor 23, resistance 22, movable contact arm 24, and conductor 25 to line conductor L1. Thus the speed of the motor 17 as related to the speed of the motor 16 will be determined by the position of the contact arm 24 along the resistance 22.

I provide a differential gear 26 having an outer ring 27 journaling a plurality of circumferentially spaced bevel gears 28 which are housed within the ring 27 and which are mounted for rotation about axes extending radially outward from the axis of rotation of the assembly 26. Engaging opposite faces of the group of bevel gears 28 is a pair of bevel gears 29 one of which is keyed to a shaft 30 while the other one is keyed to a shaft 31. Engaging the outer periphery of the roller electrode 10 is a hardened steel roller 32 which is coupled to the shaft 30 and a similar roller 33 engages the outer periphery of the electrode 11 and is coupled to the shaft 31. In actual practice suitable means, not shown, will be employed to maintain the requisite pressure contact between the steel rollers and the electrodes during wearing down of the electrodes. Because of the symmetry of the two gears 29 and the opposite directions of rotation of the rollers 32 and 33 and consequently the shafts 30 and 31 the ring 27 will not rotate so long as the speeds of the shafts 30 and 31 are the same. Now if the peripheral speeds of the electrodes 10 and 11 is the same the speeds of the rotation of shafts 30 and 31 will be equal because of the equal and constant diameters of the rollers 32 and 33 but if only one of the electrodes should pick up speed or fall behind the variation will be reflected in rotation of the ring 27 in one direction or the other as will be readily understood.

A threaded shaft 35 mounts the movable resistance arm 24 to sweep the arm across resistance 22 upon its rotation and a small reversing motor 36 is provided to rotate the shaft 35 in either direction. The armature of motor 36 is arranged to be connected across the line L1, L2 upon energization of a relay 37 and a similar relay 38 is provided to connect the armature across this line in the opposite direction. Extending from the ring 27 of the differential gear 26 is a contact arm 39 electrically connected to the line conductor L2 by means of conductor 40 and positioned for alternate engagement by the arm 39 depending on the direction of rotation of the ring 27 are the contacts 41 and 42, the first being connected to one terminal of the actuating coil of the relay 37 by means of conductor 43 while the second is connected to one terminal of the actuating coil of relay 38 by means of conductor 44. The opposite terminals of these coils are connected to line conductor L1 by means of conductor 45. Thus upon movement of contact arm 39 in the direction to engage the contact 41 which will occur if the peripheral speed of electrode 11 overtakes the peripheral speed of the electrode 10 the relay 37 will become energized to energizing motor 36 for rotation of the shaft 35 in a direction tending to decrease the value of resistance 22 in the field circuit of the motor 17. This will have the effect of slowing down the motor 17 to bring the peripheral speed of the electrode 11 down to the peripheral speed of the electrode 10. Conversely, if the speed of electrode 10 rises relay 38 will be energized to increase the value of the resistance 22 thus increasing the speed of motor 17 thereby equalizing the peripheral speeds of the electrodes.

The above specifically described embodiment of the invention should be considered as illustrative only since many changes may be made therein without departing from the spirit or scope of the invention. For example, the two direct current motors 16 and 17 may be readily replaced by one or two alternating current motors driving through a variable speed power transmission with the speed differential sensing mechanism comprising the wheels 32 and 33 controlling the speed ratio of the transmission as will be readily understood. The invention is therefore thought to reside principally in the use of devices which respond to the actual peripheral speeds of the electrodes and a comparator for sensing differences in the operation of these devices and controlling the relative speeds of the electrodes accordingly. Reference should therefore be had to the appended claims in determining the scope of the invention.

What I claim is:

1. In electric resistance seam welding apparatus having a pair of roller welding electrodes adapted to have simultaneous engagement with the work to be welded the combination of a driving means for each of said electrodes, means to vary the rotative speed of one of said driving means relative to the rotative speed of the other of said driving means, and means responsive to the peripheral speeds of said roller electrodes in control of said means to vary.

2. In electric resistance seam welding apparatus having a pair of roller electrodes adapted to have simultaneous engagement the combination of a driving means for each of said electrodes, said driving means being connected to said electrodes radially inward of the peripheries thereof, means to vary the rotative speed of one of said driving means relative to the rotative speed of the other of said driving means and means responsive to the peripheral speeds of said electrodes in control of said means to vary whereby said electrodes will have equal peripheral speeds.

3. In electric resistance seam welding apparatus having a pair of roller welding electrodes adapted to have simultaneous engagement with the work to be welded the combination of a means to drive each of said electrodes, means to vary the rotative speed of one of said driving means relative to the rotative speed of the other of said driving means, each of said electrodes having a wheel in peripheral engagement with the peripheries thereof, said wheels being of equal diameter, and means responsive to variations in the relative speed of rotation of said wheels in control of said means to vary.

4. In electric resistance seam welding apparatus having a pair of roller welding electrodes adapted to have simultaneous engagement with the work to be welded the combination of a means to drive each of said electrodes, means to vary the rotative speed of one of said driving means relative to the rotative speed of the other of said driving means, each of said electrodes having a wheel in peripheral engagement with the peripheries thereof, said wheels being of equal diameter, a differential gear interconnecting said wheels and having an element movable only upon the appearance of a speed differential in the rotation of said wheels, and means responsive to movement of said element in control of said means to vary.

5. In electric resistance seam welding apparatus having a pair of roller welding electrodes adapted to have simultaneous engagement with the work to be welded the combination of a direct current driving motor for each of said electrodes, field control means for at least one of said motors whereby the relative driving speeds of said motors may be varied, means to measure the peripheral speeds of the respective electrodes, and means responsive to the appearance of a differential in said peripheral speeds in control of said field control means whereby the peripheral driving speeds of said electrodes is maintained substantially equalized.

JOHN D. KELLER.